(12) United States Patent
Mason et al.

(10) Patent No.: US 12,381,992 B2
(45) Date of Patent: Aug. 5, 2025

(54) AUTOMATED COLOR CORRECTION

(71) Applicant: UserWay Ltd., Even Yehuda (IL)

(72) Inventors: Allon Mason, Even Yehuda (IL); Artem Lanovyy, Kharkov (UA); Leonid Muzyka, Gorokhiv (UA); Lionel Arie Wolberger, Jerusalem (IL)

(73) Assignee: UserWay Ltd., Even Yehuda (IL)

( * ) Notice: Subject to any disclaimer, the term of this patent is extended or adjusted under 35 U.S.C. 154(b) by 397 days.

(21) Appl. No.: 18/092,512

(22) Filed: Jan. 3, 2023

(65) Prior Publication Data

US 2024/0223712 A1 Jul. 4, 2024

(51) Int. Cl.
*H04N 1/60* (2006.01)
*G06V 10/60* (2022.01)
*G09G 5/02* (2006.01)

(52) U.S. Cl.
CPC .......... *H04N 1/6005* (2013.01); *G06V 10/60* (2022.01); *G09G 5/02* (2013.01); *H04N 1/6016* (2013.01); *G09G 2320/0666* (2013.01); *G09G 2340/06* (2013.01)

(58) Field of Classification Search
CPC .... H04N 1/6005; H04N 1/6016; G06V 10/60; G09G 5/02; G09G 2320/0666; G09G 2340/06
See application file for complete search history.

(56) References Cited

U.S. PATENT DOCUMENTS

2022/0284844 A1* 9/2022 Zhang ................ G06F 9/451

* cited by examiner

*Primary Examiner* — Christopher Wait

(57) ABSTRACT

A method, system, and computer program product for correcting color of elements rendered as visual display output of a computing device. Visual elements of a digital content container each comprising foreground and background portions for which foreground and background display color values being defined respectively are processed iteratively. Contrast ratio is calculated as function of the foreground and background display color values and if exceeded by an expected contrast ratio, expected foreground luminance value for the foreground portion and substitute foreground luminance value as function thereof are determined in relation to the expected contrast ratio and based on the background display color value. At least one foreground chromaticity value is obtained by converting the foreground display color value into a multi-dimensional chromatic valence color space, and an updated foreground display color value is obtained by inversely converting the substitute foreground luminance value and the at least one foreground chromaticity value.

20 Claims, 8 Drawing Sheets

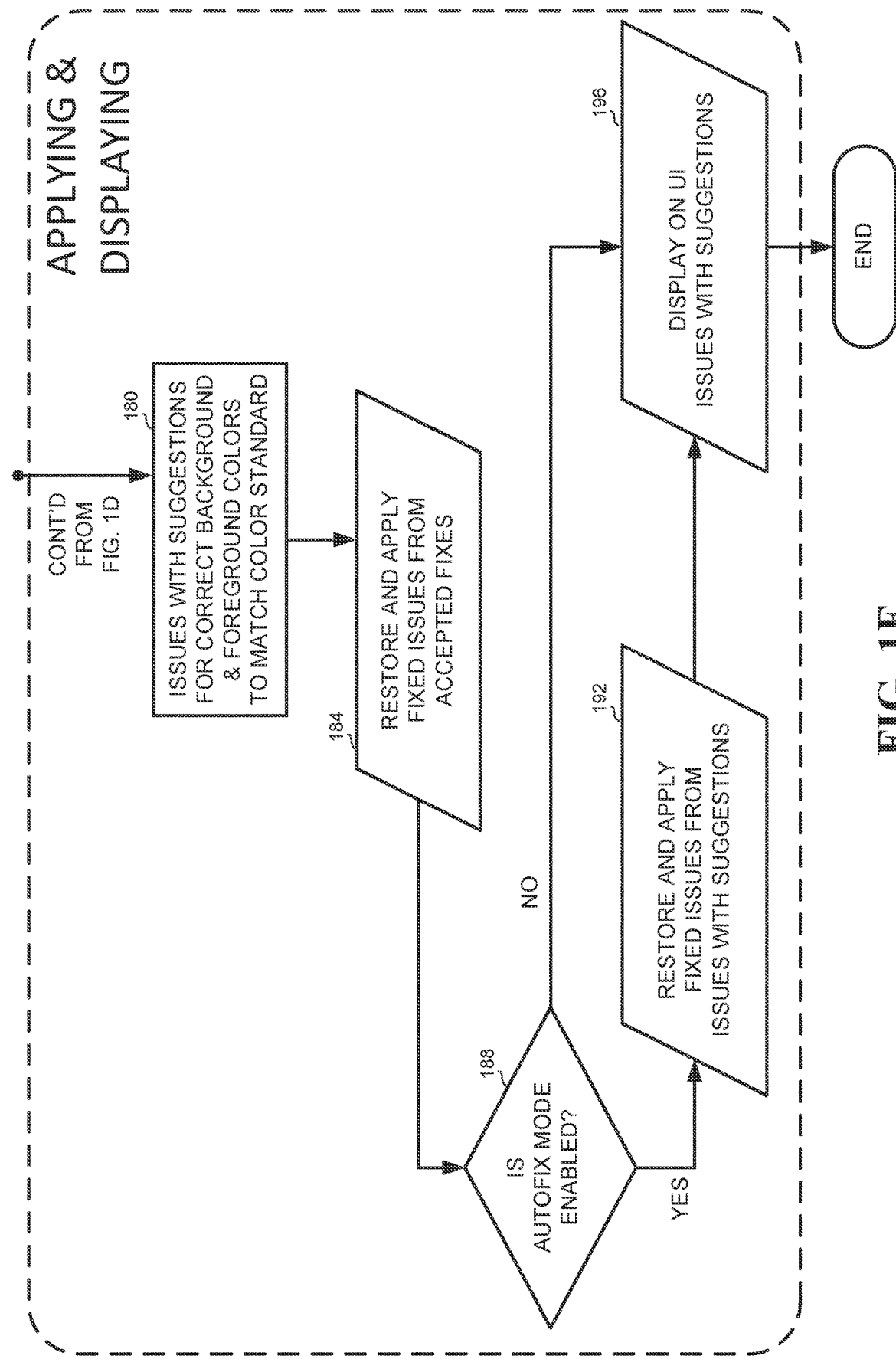

AUTOMATED COLOR CORRECTION

FILED AND BACKGROUND OF THE INVENTION

Some embodiments described in the present disclosure relate to image processing and, more specifically, but not exclusively, to automated color correction.

With the advent of telecommunications networks and computing devices proliferation and ubiquity, the volume and extent of the digital content consumer audience and correspondingly its diversity level are in constant growth, giving rise to various demands and sometimes even legal obligations for inclusion and catering to particular needs of as many distinct user populations and/or usage profile types as possible.

One prominent example of such population of users attracting special attention and treatment is that of persons with disabilities, such as for example, visually- and/or hearing-impaired individuals. The term "accessibility" often used in this context refers to the ability of disabled people to use a product or service as effectively as ones without a disability.

In the context of digital content, such as for example, content delivered over the worldwide web via communication channel(s) such as the Internet and/or the like, assistive technologies and/or accessibility arrangements for users with disabilities may be utilized and/or required in order to render the content intelligible for such users.

Color is an important feature of many visually perceivable objects and an inherent part in their design. The ability to distinguish between colors can be essential to distinguish between objects. People select colors for many different reasons. Some people choose the color of a product because they like the way it looks, while others may choose it because it is associated with a particular meaning or because it is a color that they find soothing or calming. For example, blue is often associated with calmness and tranquility, while red is often associated with excitement and energy. Some people may choose the color of a product because they want it to match other items they own or because they think it will look good in their home or office. While physical When choosing light or dark mode on a device, people may choose the one that is easier on their eyes or that they prefer the look of. Additionally, some people may choose the color of a theme for their website or social media profile because it reflects their personality or because it is aesthetically pleasing. The ability to distinguish between colors can be essential to distinguish between objects. In addition, human color perception is highly relative, and as demonstrated in the checker shadow optical illusion by Edward H. Adelson (1995) a specific color bounded area, while containing a specific color value, may be perceived as an entirely different color. Ultimately, people choose colors for a wide variety of reasons, and the reasons can vary from person to person. Companies invest in their color schemes, publish brand books and style guides specifying the colors that are to be used in their visual communication.

The colors of physical objects are typically applied by the product's designer and cannot be altered after manufacture. This means that the color of a physical object is fixed and cannot be changed by the user. In contrast, the colors of virtual digital objects created by a designer can also be altered by the user at the time of consumption. For example, a user may be able to configure their virtual display with a different color profile, theme, or changes in saturation, hue, and luminance for a virtual object. This applies whether the virtual object is displayed on a screen, on a virtual screen via projector and prism, or any other method of rendering virtual environments for visual consumption. Thus, companies may find that the colors they specified in their color schemes, brand books and/or style guides are not reproduced properly.

Screen display appearances of various computing applications and/or services, such as for example, website pages viewable via use of a browser, graphical user interfaces of application programs, and/or the like, are no exception. Accessibility of such content is a goal to be achieved by designing experiences that can be enjoyed by the widest range of people possible, thus choosing colors and/or color combinations that are visible to and discernable by as many users as possible. Moreover, it has been long recognized that end users expect to control their display, such as using zoom in and/or out to increase and/or decrease size of displayed elements, using dark mode or light mode to provide better contrast between the text and the background, making it easier to read, or to conserve power as a dark mode uses less power and can help to save battery life and extend their usage time, and/or the like. In a same and/or similar manner, in many commercially available digital displays users can change the colors and/or color palettes on the screen. It is highly desirable that these color changes remain perceptively close to the user experience as originally intended by authors of the respective digital content, such as adhering as closely as possible in look and feel to the brand book and/or the like.

SUMMARY OF THE INVENTION

It is an object of the present disclosure to describe a system and a method for automated color correction.

The foregoing and other objects are achieved by the features of the independent claims. Further implementation forms are apparent from the dependent claims, the description and the figures.

According to an aspect of some embodiments of the disclosed subject matter there is provided a method for correcting color of elements rendered as visual display output of a computing device, comprising: in each of a plurality of iterations, processing a visual element of a digital content container comprising a plurality of visual elements for rendition, the visual element comprising at least a foreground and background portions for which a foreground and background display color values are defined respectively, said processing comprising: responsive to an expected contrast ratio exceeding a contrast ratio calculated as a function of the foreground and background display color values, performing: determining, in relation to the expected contrast ratio and based on the background display color value, an expected foreground luminance value for the foreground portion and a substitute foreground luminance value as a function thereof; obtaining at least one foreground chromaticity value by converting the foreground display color value into a multi-dimensional chromatic valence color space; obtaining an updated foreground display color value by inversely converting the substitute foreground luminance value and the at least one foreground chromaticity value; and, responsive to the expected contrast ratio not exceeding an updated contrast ratio calculated as a function of the background and updated foreground display color values, providing an output of the updated foreground display color value.

According to some embodiments of the disclosed subject matter, the method further comprising: responsive to the expected contrast ratio exceeding the updated contrast ratio, performing: determining, in relation to the expected contrast ratio and based on the updated foreground display color value, an expected background luminance value for the background portion and a substitute background luminance value as a function thereof; obtaining at least one background chromaticity value by converting the background display color value into the multi-dimensional chromatic valence color space; obtaining an updated background display color value by inversely converting the substitute background luminance value and the at least one background chromaticity value; and, providing an output of the updated foreground and updated background display color values.

According to some embodiments of the disclosed subject matter, the method further comprising: responsive to a color confusion relationship between the updated background and updated foreground display color values meeting at least one predefined color confusion criterion, setting for at least one of the background and foreground portions of the visual element an alternate color value obtained using a confusion-corrective color mapping.

According to some embodiments of the disclosed subject matter, the digital content container is associated with a content structure exposing an application programming interface enabling modification of the visual element, whereby modification of the foreground display color value defined for the foreground portion of the visual element to the updated foreground display color value, and of the background display color value defined for the background portion of the visual element to the updated background display color value, is enabled via use of the application programming interface.

According to some embodiments of the disclosed subject matter, the expected contrast ratio is determined as a function of a font size associated with a textual content of the visual element.

According to some embodiments of the disclosed subject matter, the display color space is a red-green-blue (RGB) color space and the multi-dimensional chromatic valence space is CIELAB (L*a*b*) color space.

According to some embodiments of the disclosed subject matter, the method further comprising: responsive to obtaining the digital content container, transmitting to a server a request for receiving a set of contrast ratio corrections previously accepted by a user, and applying each contrast ratio correction of the set to a respective one of the plurality of visual elements.

According to some embodiments of the disclosed subject matter, the method further comprising: responsive to a user accepting a contrast ratio correction suggestion comprising the output, transmitting to a server an indication of the contrast ratio correction suggestion accepted by the user for recordation thereof in a data storage coupled to the server for allowing retrieval thereof in response to a request made to the server.

According to another aspect of some embodiments of the disclosed subject matter there is provided a computer program product comprising: a non-transitory computer readable storage medium; program instructions for executing, by a processor, a method for correcting color of elements rendered as visual display output of a computing device, the method comprising: in each of a plurality of iterations, processing a visual element of a digital content container comprising a plurality of visual elements for rendition, the visual element comprising at least a foreground and background portions for which a foreground and background display color values are defined respectively, said processing comprising: responsive to an expected contrast ratio exceeding a contrast ratio calculated as a function of the foreground and background display color values, performing: determining, in relation to the expected contrast ratio and based on the foreground display color value, an expected foreground luminance value for the foreground portion and a substitute foreground luminance value as a function thereof; obtaining at least one foreground chromaticity value by converting the foreground display color value into a multi-dimensional chromatic valence color space; obtaining an updated foreground display color value by inversely converting the substitute foreground luminance value and the at least one foreground chromaticity value; and, responsive to the expected contrast ratio not exceeding an updated contrast ratio calculated as a function of the background and updated foreground display color values, providing an output of the updated foreground display color value.

According to some embodiments of the disclosed subject matter, the computer program product further comprising program instructions for executing, by the processor: responsive to the expected contrast ratio exceeding the updated contrast ratio, performing: determining, in relation to the expected contrast ratio and based on the updated foreground display color value, an expected background luminance value for the background portion and a substitute background luminance value as a function thereof; obtaining at least one background chromaticity value by converting the background display color value into the multi-dimensional chromatic valence color space; obtaining an updated background display color value by inversely converting the substitute background luminance value and the at least one background chromaticity value; and, providing an output of the updated foreground and updated background display color values.

According to some embodiments of the disclosed subject matter, the computer program product further comprising program instructions for executing, by the processor: responsive to a color confusion relationship between the updated background and updated foreground display color values meeting at least one predefined color confusion criterion, setting for at least one of the background and foreground portions of the visual element an alternate color value obtained using a confusion-corrective color mapping.

According to some embodiments of the disclosed subject matter, the digital content container is associated with a content structure exposing an application programming interface enabling modification of the visual element, whereby modification of the foreground display color value defined for the foreground portion of the visual element to the updated foreground display color value, and of the background display color value defined for the background portion of the visual element to the updated background display color value, is enabled via use of the application programming interface.

According to some embodiments of the disclosed subject matter, the expected contrast ratio is determined as a function of a font size associated with a textual content of the visual element.

According to some embodiments of the disclosed subject matter, the display color space is a red-green-blue (RGB) color space and the multi-dimensional chromatic valence space is CIELAB (L*a*b*) color space.

According to some embodiments of the disclosed subject matter, the computer program product further comprising program instructions for executing, by the processor: responsive to obtaining the digital content container, transmitting to a server a request for receiving a set of contrast ratio corrections previously accepted by a user, and applying each contrast ratio correction of the set to a respective one of the plurality of visual elements.

According to some embodiments of the disclosed subject matter, the computer program product further comprising program instructions for executing, by the processor: responsive to a user accepting a contrast ratio correction suggestion comprising the output, transmitting to a server an indication of the contrast ratio correction suggestion accepted by the user for recordation thereof in a data storage coupled to the server for allowing retrieval thereof in response to a request made to the server.

According to yet another aspect of some embodiments of the disclosed subject matter there is provided a system for correcting color of elements rendered as visual display output of a computing device, comprising: a processing circuitry adapted to execute a code for: in each of a plurality of iterations, processing a visual element of a digital content container comprising a plurality of visual elements for rendition, the visual element comprising at least a foreground and background portions for which a foreground and background display color values are defined respectively, said processing comprising: responsive to an expected contrast ratio exceeding a contrast ratio calculated as a function of the foreground and background display color values, performing: determining, in relation to the expected contrast ratio and based on the background display color value, an expected foreground luminance value for the foreground portion and a substitute foreground luminance value as a function thereof; obtaining at least one foreground chromaticity value by converting the foreground display color value into a multi-dimensional chromatic valence color space; obtaining an updated foreground display color value by inversely converting the substitute foreground luminance value and the at least one foreground chromaticity value; and, responsive to the expected contrast ratio not exceeding an updated contrast ratio calculated as a function of the background and updated foreground display color values, providing an output of the updated foreground display color value.

According to some embodiments of the disclosed subject matter, the processing circuitry being further adapted to execute a code for: responsive to the expected contrast ratio exceeding the updated contrast ratio, performing: determining, in relation to the expected contrast ratio and based on the updated foreground display color value, an expected background luminance value for the background portion and a substitute background luminance value as a function thereof; obtaining at least one background chromaticity value by converting the background display color value into the multi-dimensional chromatic valence color space; obtaining an updated background display color value by inversely converting the substitute background luminance value and the at least one background chromaticity value; and, providing an output of the updated foreground and updated background display color values.

According to some embodiments of the disclosed subject matter, the processing circuitry being further adapted to execute a code for: responsive to a color confusion relationship between the updated background and updated foreground display color values meeting at least one predefined color confusion criterion, setting for at least one of the background and foreground portions of the visual element an alternate color value obtained using a confusion-corrective color mapping.

According to some embodiments of the disclosed subject matter, the digital content container is associated with a content structure exposing an application programming interface enabling modification of the visual element, whereby modification of the foreground display color value defined for the foreground portion of the visual element to the updated foreground display color value, and of the background display color value defined for the background portion of the visual element to the updated background display color value, is enabled via use of the application programming interface.

According to some embodiments of the disclosed subject matter, the expected contrast ratio is determined as a function of a font size associated with a textual content of the visual element.

According to some embodiments of the disclosed subject matter, the display color space is a red-green-blue (RGB) color space and the multi-dimensional chromatic valence space is CIELAB (L*a*b*) color space.

According to some embodiments of the disclosed subject matter, the processing circuitry being further adapted to execute a code for: responsive to obtaining the digital content container, transmitting to a server a request for receiving a set of contrast ratio corrections previously accepted by a user, and applying each contrast ratio correction of the set to a respective one of the plurality of visual elements.

According to some embodiments of the disclosed subject matter, the processing circuitry being further adapted to execute a code for: responsive to a user accepting a contrast ratio correction suggestion comprising the output, transmitting to a server an indication of the contrast ratio correction suggestion accepted by the user for recordation thereof in a data storage coupled to the server for allowing retrieval thereof in response to a request made to the server.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the Drawings:

FIGS. 1A-1E are respective first, second, third, fourth and fifth portions of a flowchart schematically representing an optional flow of operations for color correction, according to some embodiments;

DESCRIPTION OF SPECIFIC EMBODIMENTS OF THE INVENTION

Figure 1A:
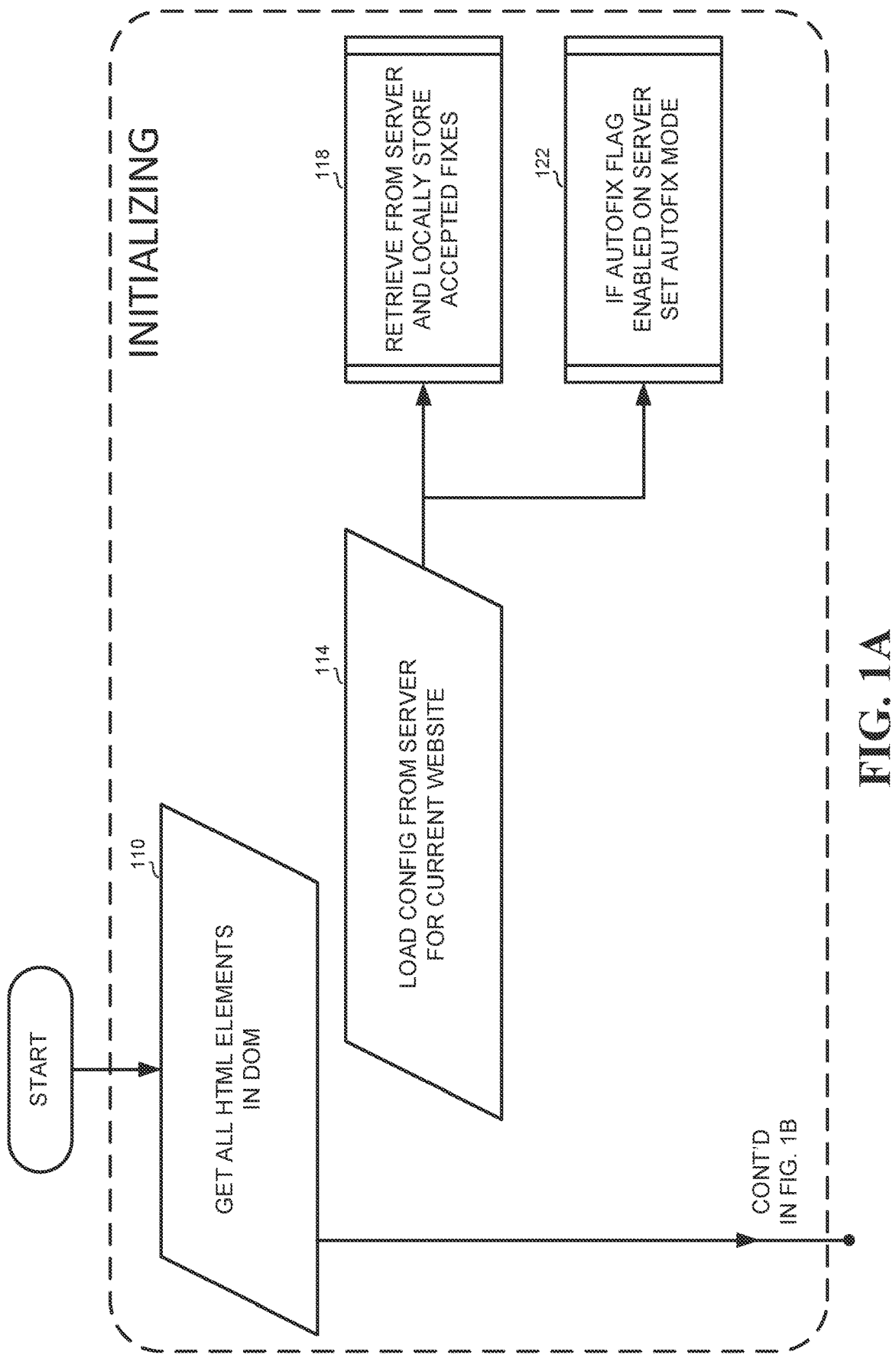

Some embodiments described in the present disclosure relate to user experience design and, more specifically, but not exclusively, to automated color correction.

One technical challenge dealt with by the disclosed subject matter is to provide for color correction complying with accessibility requirements and/or standards, such as for example a target specification of contrast ratio and/or the like, while optimally preserving resemblance to a pre-correction color experience as may be visually perceived by users with non-impaired vision consuming digital content containing colored elements. The pre-corrected color experience might be highly significant to an originator, owner, and/or other likewise stakeholders of the content, as for example when an organization's brand or style book dictates that certain colors are permitted to express the brand and no other colors are permitted. These rules may be specified in a color standard for that organization's materials and/or products, digital and/or non-digital. Such color standards may variably differ from business to business and/or organization to organization in the color values, as well as in font and/or typeface types and/or names, font weights, font sizes, and/or the like, and further in specified particular standards of how colors are intended to be experienced by users consuming the content, such as for example, as part of a particular brand, campaign, and/or the like. In the context of the present disclosure, such collection of color specifications is referred to herein as "instance-specific color standard."

Some instance-specific color standards specify only a few permitted colors. Others specify a broad range of colors, with options that may include high contrast juxtapositions of foreground and background colors. For example, many instance-specific color standards permit a blank and white version of a logo and/or the like. Black on white or white on black are very high contrast and are to be used when color is not available for the display, whether electronic or print.

Another technical challenge dealt with by the disclosed subject matter is to provide for color correction aimed at catering to user preferences and/or settings of color display, as well as maintaining a color experience of that user as close as possible to an intended color experience by a content originator in accordance with an instance-specific color standard and/or the like. Operating systems, display drivers, LCD displays, and printers for example, may vary highly as to their color fidelity. Operating systems may offer options such as dark mode, night-time display, and/or the like. Some browser extensions and/or operating systems display settings offer high contrast mode that change display colors in ways that increase an overall contrast. However, these color changes may be applied categorically without discern, including undesirably changing colors specifically selected by an originator of the content as conforming with the instance-specific color standard. It may therefore be desirable that user prescribed changes are enabled while at the same time the results are still relatively close to a target color experience, such as defined in a brand book and/or the like.

In various practical applications and likewise contexts there may be certain limitations, prerequisites and/or constraints imposed on color display and/or color standards being used. One example of a scenario of this sort is that of color contrast minimums. An exemplary standard for accessibility of digital content such as web content and/or the like is the Web Content Accessibility Guidelines (WCAG) 2.x W3C Recommendation, developed by the World Wide Web Consortium (W3C) organization as part of its Web Accessibility Initiative (WAI) project, where the symbol "x" in 2.x represents the number of the standard, the entire contents of which are hereby incorporated by reference herein without giving rise to disavowment. The WCAG 2.x document defines how to make web content more accessible to people with disabilities, with a goal of providing a shared standard for web content accessibility that meets the needs of individuals, organizations, and governments internationally, designed to apply broadly to different web technologies now and in the future, and to be testable with a combination of automated testing and human evaluation.

The WCAG 2.0 sets several principles for web content to adhere to in order to achieve accessibility goals, the first of which, captioned "Principle 1", stipulates that web content should be perceivable, namely, information and user interface components must be presentable to users in ways they can perceive. Specifically, in Guideline 1.4 it is stated that content should be distinguishable, where a content originator should make it easier for users to see and hear content including separating foreground from background. Guideline 1.4.3 specifies minimum requirements for contrast, at conformance level AA (a middle level between a minimum conformance level A and a maximum conformance level AAA). According to guideline 1.4.3, visual presentation of text and images of text should have a contrast ratio of at least 4.5:1, except for the following: (i) large text—large-scale text and images of large-scale text should have a contrast ratio of at least 3:1; (ii) incidental—text or images of text that are part of an inactive user interface component, that are pure decoration, that are not visible to anyone, or that are part of a picture that contains significant other visual content, have no contrast requirement; (iii) logotypes—text that is part of a logo or brand name has no minimum contrast requirement.

The term "contrast ratio" as used in guideline 1.4.3 is defined in a glossary appended to the WCAG 2.0 as Appendix A, using the formula (1) as follows:

$$(L1 + 0.05)/(L2 + 0.05) \qquad (1)$$

where

L1 is the relative luminance of the lighter of the colors, and

L2 is the relative luminance of the darker of the colors.

Throughout the present disclosure, for illustrative purposes and ease of understanding, reference is made to a color space denoted as "sRGB color space" or "sRGB". The sRGB color space is a standard RGB (red, green, blue) color space sRGB that HP and Microsoft created cooperatively in 1996 to use on monitors, printers, and the World Wide Web and that was subsequently standardized by the International Electrotechnical Commission (IEC) as IEC 61966-2-1:1999.

The term "relative luminance" as used in the afore-said definition of contrast ratio is further defined in the glossary as the relative brightness of any point in a color space, normalized to 0 for darkest black and 1 for lightest white. According to Note 1 to the definition, for the sRGB color space, the relative luminance of a color is defined using the formula (2) as follows:

$$L = 0.2126 * R + 0.7152 * G + 0.0722 * B \quad (2)$$

where given a threshold value T1=0.03928, R, G and B are defined as:

if $R_{sRGB} <= T1$ then $R =$ $$R_{sRGB}/12.92 \text{ else } R = ((R_{sRGB} + 0.055)/1.055)^{\wedge} 2.4$$

if $G_{sRGB} <= T1$ then $G =$ $$G_{sRGB}/12.92 \text{ else } G = ((G_{sRGB} + 0.055)/1.055)^{\wedge} 2.4$$

if $B_{sRGB} <= T1$ then $B =$ $$B_{sRGB}/12.92 \text{ else } B = ((B_{sRGB} + 0.055)/1.055)^{\wedge} 2.4$$

and $R_{sRGB}$, $G_{sRGB}$, and $B_{sRGB}$ are defined as:

$$R_{sRGB} = R_{8bit}/255$$
$$G_{sRGB} = G_{8bit}/255$$
$$B_{sRGB} = B_{8bit}/255$$

It will be appreciated that while the disclosed subject matter in some embodiments thereof is described and illustrated herein at enhanced attention and detail with regard to an exemplary scenario of color contrast minimums, such discussion is intended however merely for the sake of convenience and ease of understanding and not meant to be limiting in such manner, but rather the disclosed subject matter may be utilized in any other likewise and/or similar contexts of digital content renditions, as can be readily apparent to a person skilled in the art. For example, there may be various visual impairments that may call for distinct color modifications in order to render the content accessible for target audiences. People with color blindness such as protanopia, deuteranopia or tritanopia sight do not perceive colors the way trichromatic, or typical fully abled people, see colors. A color selected for maximum color contrast may not be perceptible to someone with one of these types of color blindness. A target color standard and/or set of respective color standards may be defined with the needs of one or more of these color blindness conditions in mind.

While detection of non-compliance of content with a target color standard such as minimum contrast ratio requirements and/or the like can be fairly easily performed using automated procedures and tools, correction of non-compliant visual elements in a digital content container such as, for example, a web page, an application program display, a graphical user interface (GUI) of a software product and/or the like, can be a challenging and non-trivial task. Increasing or decreasing an intensity level of one or more color channels in sRGB color space may affect other qualities of the color experience in addition to brightness, such as hue and/or saturation, in a manner that may be hard to predict in advance. The result may thus deviate greatly from a color and/or color palette originally specified in an instance-specific color standard and/or the like intended to be experienced by users consuming the content, such as for example, as part of a particular brand, campaign, and/or the like. In some embodiments, color correction to at least one of a plurality of visual elements for display comprised in a digital content container may be performed by converting a color of a foreground portion of an element, from screen color space into a chromaticity valence color space, such as the CIELAB color space and/or the like, setting a luminance of the converted color to a value determined as a function of an expected contrast ratio and a color of a background portion of the element, inversely converting the luminance and chromaticity values back to screen color space representation and setting the result as an updated color of the foreground portion of the element.

Based on the updated color of the foreground portion, an updated contrast ratio may be calculated and compared to a predetermined threshold. In case that additional correction of a contrast ratio is required, a color of the background portion may be updated using a similar process, namely, by converting the color of the background portion into the chromaticity valence color space, setting a luminance of the converted color to a value determined as a function of the expected contrast ratio and the updated foreground color, inversely converting the luminance and chromaticity values back to screen color space representation and setting the result as an updated color of the background portion of the element.

In some embodiments, minor changes in foreground and/or background color such as by predefined unit increments and/or decrements along one or more axes in a respective color space and/or the like may be cycled through and/or iteratively performed, until a maximum color contrast is achieved with a minimum color change, as may be measured for example by a delta of an updated color from a respective original color in the chromaticity valence color space representation, an aggregation of the respective deltas of updated and original foreground and background colors, and/or likewise color distance and/or difference metrics.

Optionally conversion between color spaces and inverse thereof may entail one or more intermediate transformations, for example, an RGB color of an element portion, i.e., background, foreground, and/or the like, may be obtained and transformed from RGB to sRGB, then from sRGB to CIE XYZ, then from CIE XYZ to CIE LAB, and vice versa in a backwards order for converting back to RGB.

In some embodiments, a combination of the color values of the foreground and background portions of the element either prior to and/or following an update of either one and/or both may be checked for a likelihood of confusion therebetween by a person having color vision impairment such as color blindness and/or the like, since such confusion affects the perceived color contrast experienced by a person with that impairment. Optionally a pre-stored look-up table, matrix and/or any likewise data structure may be provided wherein an entry may specify for a given color pairing whether such color vision impaired person and/or group of persons with various impairment kinds may confuse these colors, namely perceive them as identical and/or undiscerned from one another. A color confusion relationship between a pair of colors may be represented for example as a predicate function taking Boolean values denoting whether confusion is likely or unlikely, a real function taking numerical values denoting a probability of confusion (e.g., based on empirical data, statistics, and/or the like), and/or any likewise representation. One or more color confusion criteria may be defined accordingly such that when the criteria being met, the pair of colors may be considered as likely confused and an appropriate correction of one or both of these colors may be called for. Using a pre-defined mapping which may too be represented in a corresponding table and/or likewise data structure, an alternate color may be selected in substitution of the original color from the pair of likely confused colors. Such pre-defined mapping may be initialized with default alternate color values and/or alternate pairs of color values, and optionally may be further refined manually, automatically and/or semi-automatically using a target color standard (e.g., a brand book and/or the like) provided by an owner of the digital content.

In some embodiments, the plurality of visual elements in the digital content container may be modelled as objects, that may be accessed and modified via an Application Programming Interface (API), such as may be provided by a suitable content structure associated with the digital content container. Setting the updated color for the foreground and/or background portion of the element may be performed by modifying the element using the API so that the updated color may be injected into the element in substitution of a pre-existing color value, thereby causing the updated color to be presented to a user responsive to processing of the element by an on-screen display rendering procedure applied to the digital content container or a respective portion thereof.

In some embodiments, colors of one or more elements cannot be altered directly by any API or digital manipulation. For example, they may be colors defined in a tag image file format (TIFF) and/or the like. In such cases the updated colors may be displayed via additive image processing techniques such as by using an appropriate mask image, alpha-transparent color(s), and/or the like, that may be rendered in overlay or juxtaposition with the original image and/or respective element, similarly as color filters may be used in photography for changing colors of a captured scene image without changing the actual scene.

In some embodiments, the updated color may be transferred to and recorded in a suitable data store, such as for example, a software development system, a code repository, a backend database server, and/or the like. Optionally in response to a request for accessing and/or loading the digital content container, the data store may be queried for corresponding recorded color updates stored therein and the color updates may be retrieved therefrom and returned to an originator of the request. The retrieved color updates may then be injected into respective elements from the plurality of visual elements using the API so as to replace former colors associated therewith and cause thereby to the respective updated color(s) be presented to the user in response to the digital content container and/or respective elements therein being processed by an on-screen display rendering procedure, in a same manner as described herein.

In some embodiments, the data store may comprise and optionally make available to the API a weighted statistical color map, where color modifications that may have been found to be perceived by more human viewers as identical and/or approximately identical may be weighted higher than color changes that may have been found to be perceived as greater color shifts. The weighted color choices may be gathered by research, predicted by artificial intelligence based on color changes that have been approved by users, and/or the like. The respective updated color(s) may be chosen as those predicted according to the map as most likely to be perceived as closest to a respective instance-specific color standard.

Optionally the updated color may be presented to a user via a user interface and an approval of the user may be solicited prior to modifying the element and/or recording the updated color in the data store. Additionally or alternatively, an automated fixing ("autofix") flag may be used for obviating solicitation of a user approval of the updated color for each element separately, where multiple elements from the plurality of visual elements in the digital content container may require color contrast ratio correction. The autofix flag may be selectively set on and/or off by the user via the user interface.

An exemplary programming interface that may be utilized for carrying out some embodiments of the disclosed subject matter is the API standard known as Document Object Model (DOM), which is a cross-platform and language-independent interface for accessing and manipulating Extensible Markup Language (XML) and HTML documents, developed and maintained by the World Wide Web Consortium (W3C) and Web Hypertext Application Technology Working Group (WHATWG) organizations. The DOM connects HTML and/or XML documents such as, for example, web pages and/or the like to scripts and/or programming languages by representing the structure of a document in memory as a logical tree, wherein each branch of the tree ends in a node, and each node contains one or more objects. DOM methods allow programmatic access to the tree, such that the document's structure, style, content, and/or the like can be changed dynamically. With the DOM, programmers can create and build documents, navigate their structure, and add, modify, or delete elements and content thereof.

For example, in case of a web page composed as an HTML document, an application program such as a web browser and/or the like that may be used to render the document, may employ for that purpose an implementation of DOM or a likewise internal model similar thereto. When a web page is loaded, the web browser may create a DOM representation of the underlying HTML document which may act as an interface to the document and be harnessed by scripting languages such as JavaScript, Python, and/or the like for dynamic changing of the web page and/or its content, e.g., add, change, and remove any of the HTML elements and attributes, change any of the CSS style, react to any and/or all of the existing events, create new events, and/or the like.

For the sake of convenience and ease of understanding, the disclosed subject matter in some embodiments thereof is described and illustrated herein in focus on digital content of web pages and/or web application programs specifically, however it is not meant to be limited in such manner and may be utilized in any other likewise contexts of digital content renditions, as can be readily apparent to a person skilled in the art.

It would be appreciated by a skilled artisan that elements in digital content containers may comprise pre-formatted image files defining an image to be displayed (e.g. PNG, JPG, GIF, SVG and/or any likewise image file formats), programmatic specifications of characters (e.g., letters, numerals, symbols, and/or the like), and optionally their styles, that become images when rendered on screen, and/or combinations of both. Characters specifications may comprise for example fonts, optionally marked up with semantics such as H1, EM, INPUT and/or the like, which when rendered on a rendering device such as a screen or printed page become an image. Further exemplary specifications of characters may comprise buttons, autofill suggestions, and any likewise other uses of text in conventional look-and-feel arrangements as affordances, that may become images when rendered for display and/or print. The disclosed subject matter is not meant to be limited to a particular type of digital content and/or container elements and may be utilized in any of the afore-said use cases without loss of generality as described herein.

It will be further appreciated that while some exemplary embodiments of the disclosed subject matter are described and illustrated herein with relation to contrast of foreground and background objects one of which being and/or comprising text and/or likewise structured content, such as symbols, characters, icons, and/or the like as found on web pages and/or web application programs, the disclosed subject matter is not meant however to be limited in such manner and may be utilized in any other likewise contexts of non-text digital content renditions, as can be readily apparent to a person skilled in the art.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIGS. 1A-1E which are respective first, second, third, fourth and fifth portions of a flowchart schematically representing an optional flow of operations for color contrast ratio correction, according to some embodiments.

Referring now to FIG. 1A, an exemplary flow of operations for color contrast ratio correction of one or more visual elements in a digital content container, such as an HTML/XML document (e.g., a web page) and/or the like, may begin at initialization procedure as shown. Optionally the one or more visual elements and/or a subset thereof may be textual and/or comprise text content otherwise (e.g., an image of an object having text printed thereon and/or the like).

In some embodiments, the digital content container may be associated with a content structure exposing an application programming interface (API) enabling modification of an element of the content container. For example, the container may be a web page composed as an HTML document, and the content structure and API for modifying HTML elements of the web page may be a Document Object Model (DOM) thereof.

At 110 content element(s) of the digital content container may be obtained, for example, any and all HTML elements in a DOM associated with the container may be retrieved and kept available at hand. At 114 a stored configuration for the content container (e.g. of a website, a web application, and/or any likewise digital content container(s) collection to which the container may pertain) may be loaded from a respective data store, such as an online server and/or the like. At 118 a set of accepted fixes comprising zero or more color corrections accepted by a user for elements in the container may be retrieved from the server. At 122 if an AUTOFIX flag is enabled on the server, an automated fixing (autofix) mode may be set.

Figure 1B:
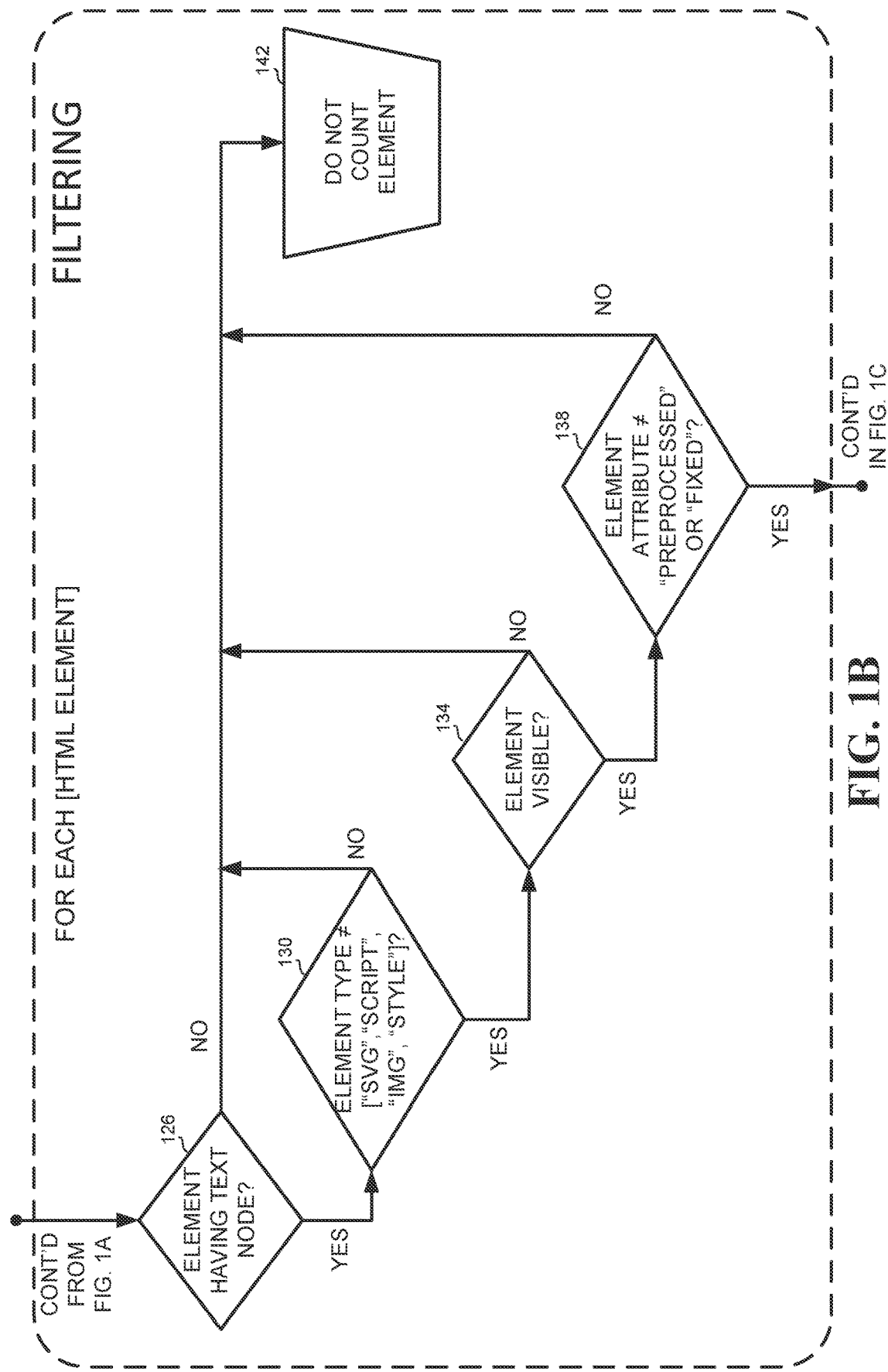

Referring now to FIG. 1B, the exemplary flow of operations for color correction may proceed to filtering procedure as shown.

At 126 an element of the digital content container, such as obtained at 110 of FIG. 1A, may be checked for having a textual content associated therewith, e.g. a text node in the DOM and/or the like, and if so the filtration may proceed to one or more additional checks. At 130 a determination may be made as to whether the element is of a type for which a correction may not be required, such as for example, a script element, a style element, and/or the like. In some embodiments, additional and/or alternative determination may be made at 130 as to whether the element is of a type for which a non-API-based correction may be required, such as for example, a Scalable Vector Graphics (SVG) element, an image (IMG) element, and/or the like. Such elements may be corrected using digital image processing techniques for applying updated foreground and/or background color values determined as described herein. At 134 the element may be checked for visibility thereof, i.e. whether the element is shown on a screen display of the digital content in the container. At 138 the element may be checked for not being associated with a PREPROCESSED or FIXED attribute. At 142, in case that any one of the checks as performed throughout 126 to 138 yields a negative answer, the element may not be counted for API-based updating, and the procedure may move on to another element of the container.

Figure 1C:
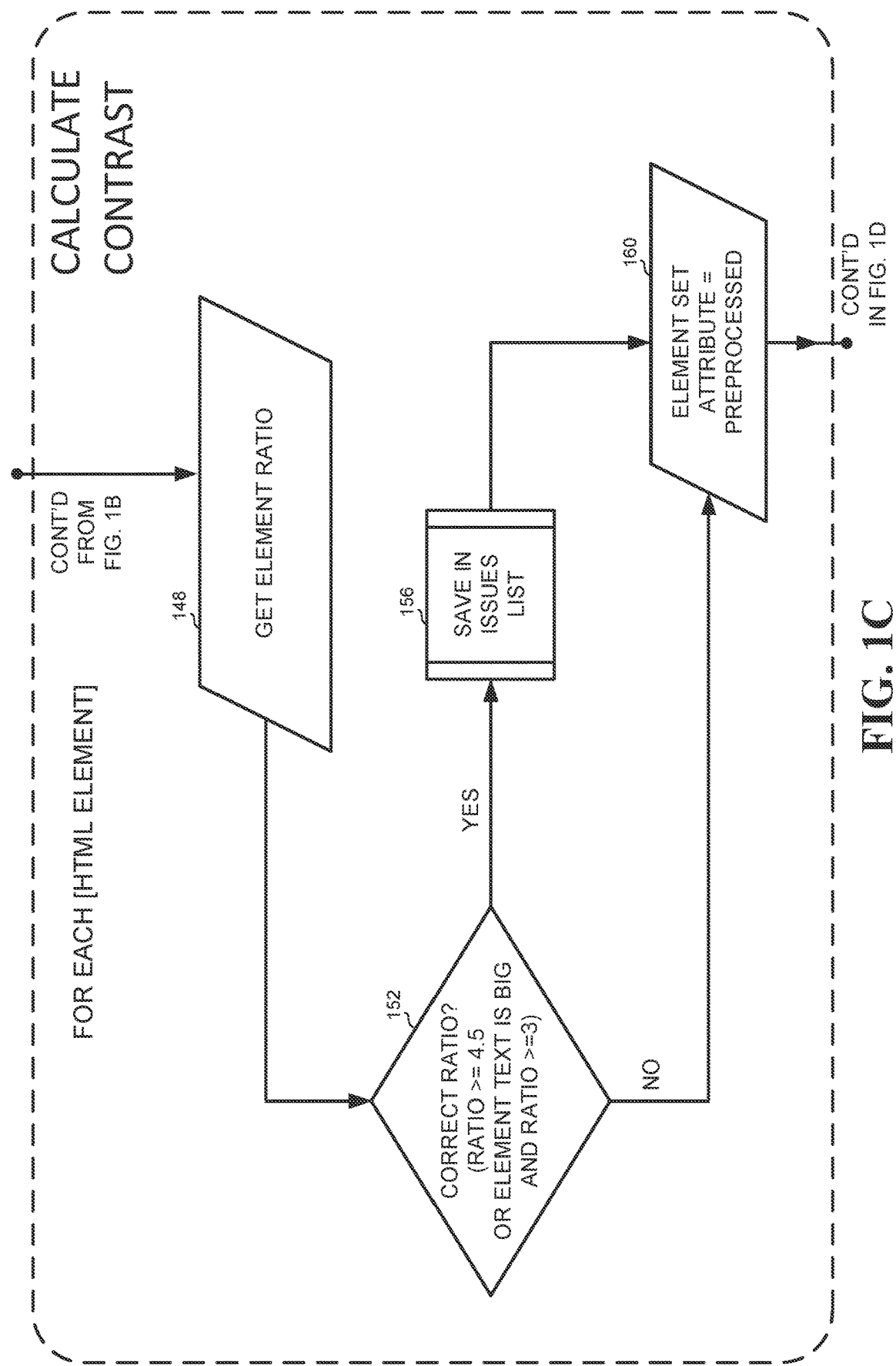

Referring now to FIG. 1C, in some embodiments where color contrast ratio correction may be required, the exemplary flow of operations for color correction may proceed to contrast calculation procedure as shown.

At 148 an element that had not been filtered out at 142 of FIG. 1B may be obtained and a contrast ratio may be calculated therefor. The calculation may be performed similarly as defined in an applicable digital content accessibility standard, such as the WCAG 2.0 and/or the like, as discussed herein. At 152 a determination may be made as to whether the contrast ratio as calculated at 148 satisfies a compliance requirement, or a correction thereof may be required. For example, if the ratio is equal to or greater than 4.5, or alternatively the textual content of the element having a large enough font size (e.g., an element text attribute is set to BIG) and additionally the ratio is equal to or greater than 3, such as in conformance level AA of the Web Content Accessibility Guidelines (WCAG) 2.x, then the ratio may be deemed as correct and the procedure may continue at 160. Otherwise, at 156 the element may be saved in an issues list or a likewise data store for further processing, and thereafter proceed to 160, where the element may be set with an attribute of PREPROCESSED.

Figure 1D:
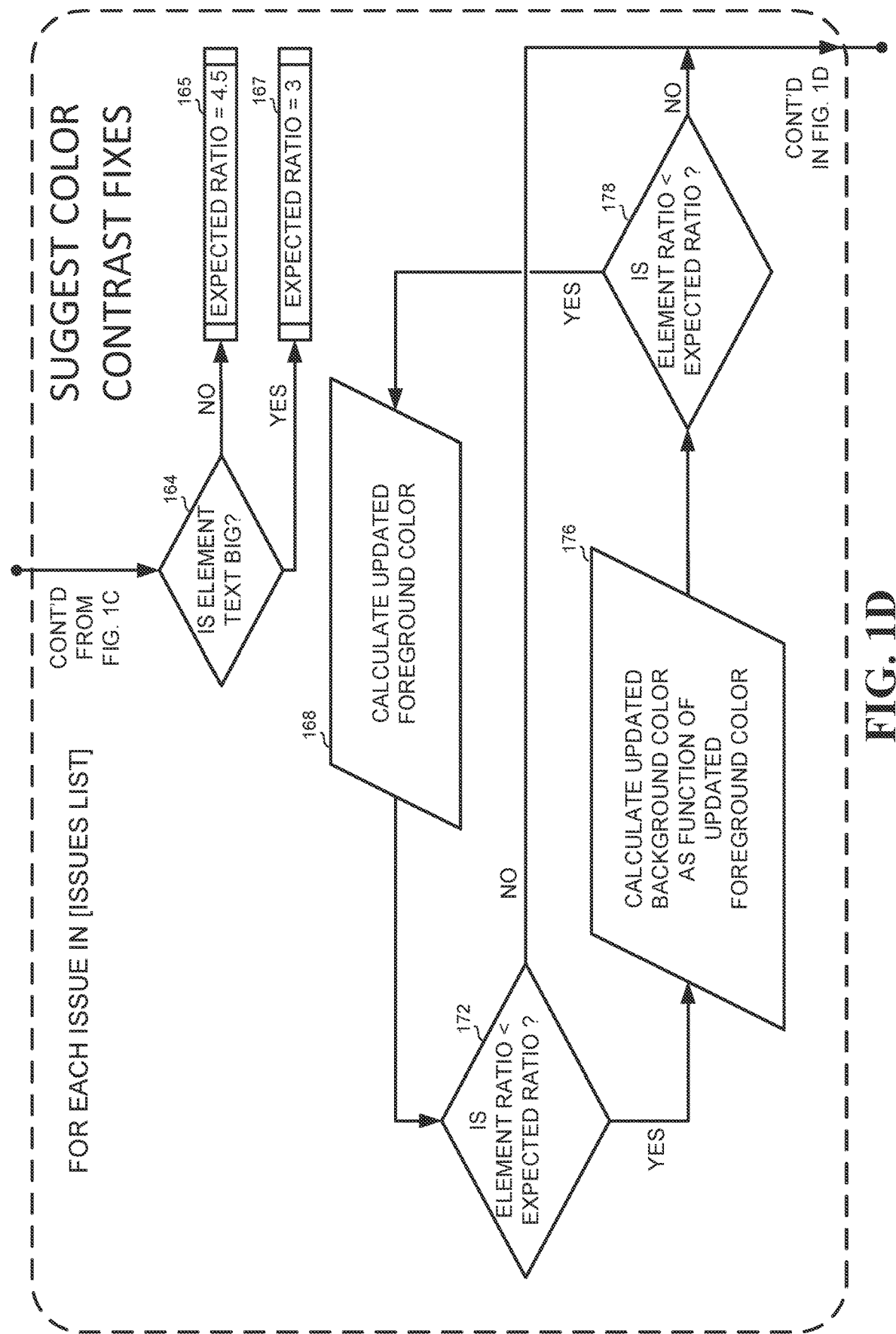

Referring now to FIG. 1D, the exemplary flow of operations for color contrast ratio correction may proceed to color contrast fixes suggestion procedure as shown.

At 164, an element in the issues list may be obtained and queried for a size of a text content thereof. For example, and similarly as discussed herein, the element text may checked for whether an attribute denoting a font size thereof is set to BIG, and accordingly an expected ratio may be set, where at 165, the expected ratio may be set to 4.5 in case the element text font size attribute is not set to BIG, and otherwise at 167 the expected ratio may be set to 3. At 168 an updated foreground color may be calculated. An exemplary method for updated foreground color calculation is described and illustrated herein in FIG. 2 and accompanying text. At 172 a check may be made as to whether a contrast ratio of the element with the updated foreground color calculated at 168 falls below the expected ratio set at 165 or 167, as applicable. If so, at 176 an updated background color may be calculated as a function of the updated foreground color calculated at 168. An exemplary method for updated background color calculation is described and illustrated herein in FIG. 3 and accompanying text. Otherwise, the procedure may move on to a next element in the issues list obtained at 164. In some embodiments, an iterative framework may be employed where in a further iteration updated foreground and/or updated background color value(s) may be calculated as a function of respective value(s) thereof obtained in a preceding iteration, until a contrast ratio of the element following respective update(s) exceeds the expected ratio, such as may be determined at 178. The updated background and/or updated foreground color(s) calculated for the element at 176 and 168 respectively may be stored in a list and/or likewise data store of issues with suggestions for correct background and foreground colors by which a correct contrast ratio being achieved, for further processing and/or usage in any succeeding stage(s).

Referring now to FIG. 1E, the exemplary flow of operations for color correction may proceed to applying and displaying procedure as shown.

At 180 a list of issues with suggestions for correct background and foreground colors for a color standard to be matched such as correct contrast ratio and/or the like, such as may be yielded by performing the procedure of FIG. 1D, may be obtained. At 184 previously fixed issues from a set of accepted fixes, such as obtained at 118 of FIG. 1A, may be restored and applied to elements of the container. At 188 a check whether autofix mode is enabled may be performed. If so, at 192 fixed issues from the list of issues with suggestions retrieved from the server at 180 may be restored and applied to elements of the container. Otherwise, at 196 an output of items on the list of issues with suggestions may be provided via display on a user interface and/or the like, whereby allowing a user to manually accept individual fixes proposed and/or select an alternative color contrast correction of an element. Optionally a fix accepted by the user may be updated in the set of accepted fixes stored at the server.

Figure 2:
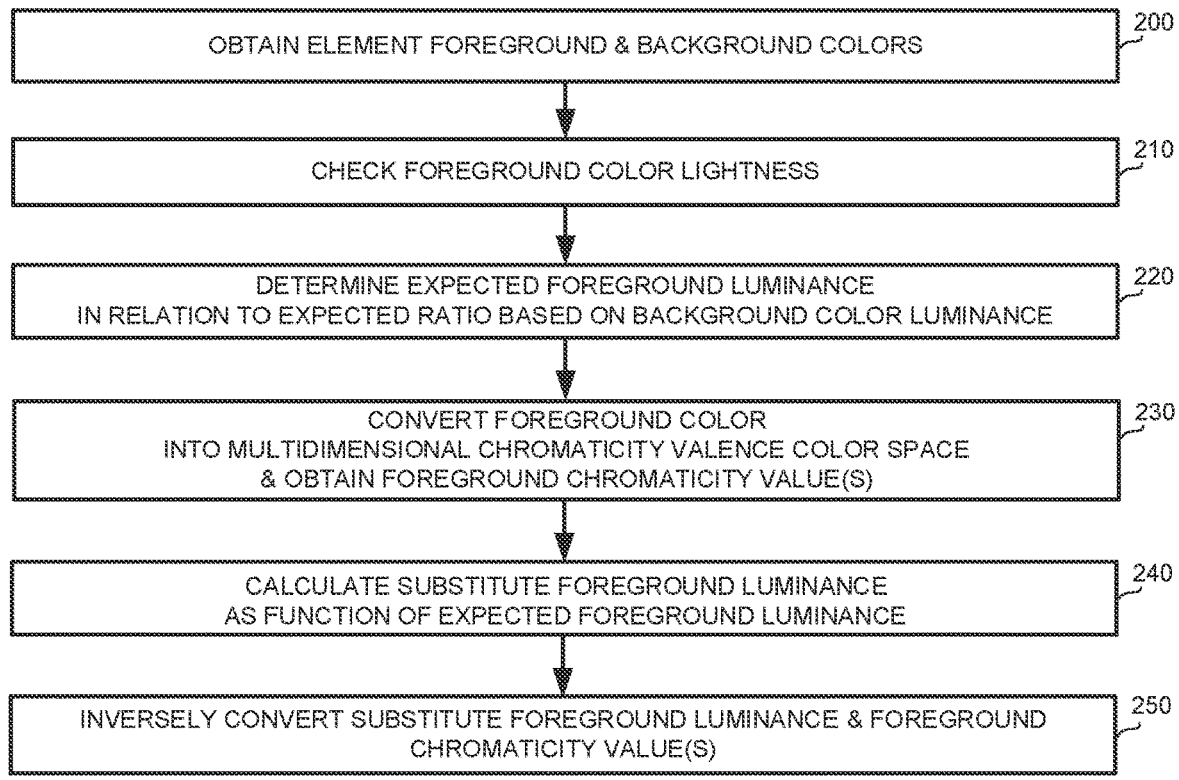
FIG. 2 is a flowchart diagram of a method for updated foreground color calculation in color contrast ratio correction, according to some embodiments.

Reference is now made to FIG. 2 which is a flowchart diagram of a method for updated foreground color calculation in color contrast ratio correction, according to some embodiments.

At 200 a foreground color and a background color of an element for contrast correction may be obtained. At 210 a current lightness of the foreground color may be checked. Optionally a Boolean variable "isLight" may be defined and the check may be performed as in the following formula (3):

$$\text{isLight} = FCL > BCL \quad (3)$$

where FCL and BCL are defined as follows:
FCL—Foreground Color Luminance which is calculated using relative luminance, as defined in formula (2), of the foreground color;
BCL—Background Color Luminance which is calculated using relative luminance, as defined in formula (2), of the background color.

At 220 an Expected Foreground Luminance (EFL) may be determined in relation to an Expected Contrast Ratio (ER) and based on the Background Color Luminance (BCL). The determination of EFL may further be in accordance with the lightness variable isLight as set at 210, such as defined either in formula (4) or formula (5) as follow:

if isLight:
$$EFL = (ER + 0.05 * BCL + 0.05) - 0.05 \quad (4)$$
else:
$$EFL = \bigl((BCL + 0.05)/ER\bigr) - 0.05 \quad (5)$$

where ER and BCL are:
ER—Expected contrast Ratio with relation to font size and expected ratio on output (could be equal 3 or 4.5, as in an exemplary setting of WCAG compliance level AA);
BCL—Background Color Luminance similarly as discussed herein.

At 230 the foreground color may be converted from screen color space into a multidimensional chromaticity valence color space and at least one foreground chromaticity value may be thus obtained. Optionally the chromaticity valence color space may be the CIELAB color space and the foreground chromaticity value(s) may be the a* and b* coordinate values obtained by the conversion. Optionally the conversion may be two-fold, i.e., a first conversion may be from RGB or sRGB color space to CIE XYZ color space, and a second conversion may be from CIE XYZ color space to CIELAB color space.

At 240 a substitute foreground luminance value for perceptual lightness may be calculated as a function of the expected foreground luminance EFL determined at 220. The substitute foreground luminance value denoted herein as L* may be calculated for example using the following formula (6):

$$L* = (116 * EFL)^{1/3} - 16 \quad (6)$$

At 250 the substitute foreground luminance value L* calculated at 240 and the foreground chromaticity value(s) a* and b* obtained at 230 may be inversely converted from CIELAB color space back to screen color space (RGB, sRGB, and/or the like). Optionally the transformation back from CIELAB to screen color space may be two-fold as well, via the CIE XYZ color space and/or the like.

Figure 3:
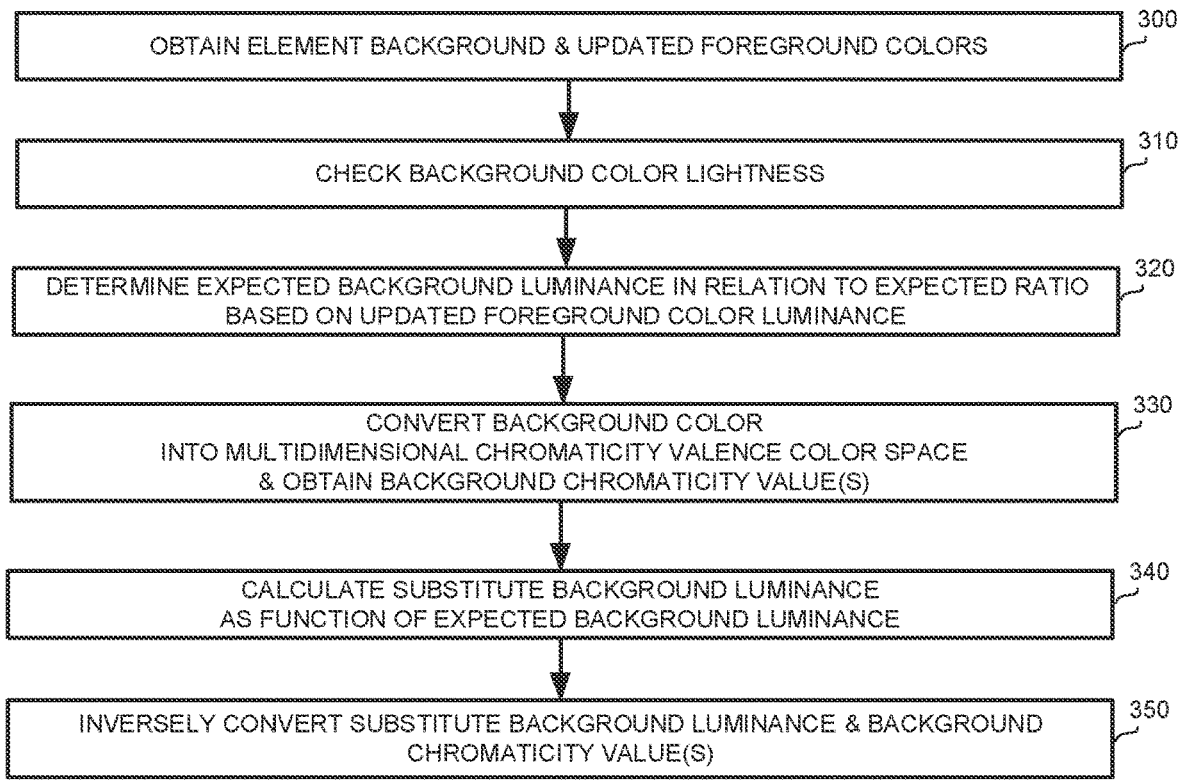
FIG. 3 is a flowchart diagram of a method for updated background color calculation in color contrast ratio correction, according to some embodiments.

Reference is now made to FIG. 3 which is a flowchart diagram of a method for updated background color calculation in color contrast correction, according to some embodiments.

At 300 a background color and an updated foreground color of an element for contrast correction may be obtained. The updated foreground color may be obtained using a procedure similarly as illustrated in FIG. 2. At 310 a current lightness of the background color may be checked. Optionally a Boolean variable "isLight" may be defined and the check may be performed as in the following formula (7):

$$\text{isLight} = BCL > FCL \quad (7)$$

where FCL and BCL are defined as follows:
FCL—Foreground Color Luminance which is calculated using relative luminance, as defined in formula (2), of the updated foreground color;
BCL—Background Color Luminance which is calculated using relative luminance, as defined in formula (2), of the background color.

At 320 an Expected Background Luminance (EBL) may be determined in relation to an Expected Contrast Ratio (ER) and based on the Background Color Luminance (BCL). The determination of EBL may further be in accordance with the lightness variable isLight as set at 310, such as defined either in formula (8) or formula (9) as follow:

if isLight:

-continued $$EBL = (ER + 0.05 * FCL + 0.05) - 0.05 \quad (8)$$

else:

$$EBL = ((FCL + 0.05)/ER) - 0.05 \quad (9)$$

where ER and FCL are:
ER—Expected contrast Ratio with relation to font size and expected ratio on output (could be equal 3 or 4.5, as in an exemplary setting of WCAG compliance level AA);
FCL—Foreground Color Luminance similarly as discussed herein.

At 330 the background color may be converted from screen color space into a multidimensional chromaticity valence color space and at least one background chromaticity value may be thus obtained. Optionally the chromaticity valence color space may be the CIELAB color space and the background chromaticity value(s) may be the a* and b* coordinate values obtained by the conversion. Optionally the conversion may be two-fold, i.e., a first conversion may be from RGB or sRGB color space to CIE XYZ color space, and a second conversion may be from CIE XYZ color space to CIELAB color space.

At 340 a substitute background luminance value for perceptual lightness may be calculated as a function of the expected background luminance EBL determined at 320. The substitute background luminance value denoted herein as L* may be calculated for example using the following formula (10):

$$L^* = (116 * EBL)^{1/3} - 16 \quad (10)$$

At 350 the substitute background luminance value L* calculated at 340 and the background chromaticity value(s) a* and b* obtained at 330 may be inversely converted from CIELAB color space back to screen color space (RGB, sRGB, and/or the like). Optionally the transformation back from CIELAB to screen color space may be two-fold as well, via the CIE XYZ color space and/or the like.

It will be appreciated by a person skilled in the art that by transforming screen color values into a multidimensional chromaticity valence color space such as CIELAB color space and/or the like, there may be provided a possibility to separately and selectively affect a brightness level (and contrast with a surrounding in consequence) and an individual color of an element on a screen display.

Figure 4:
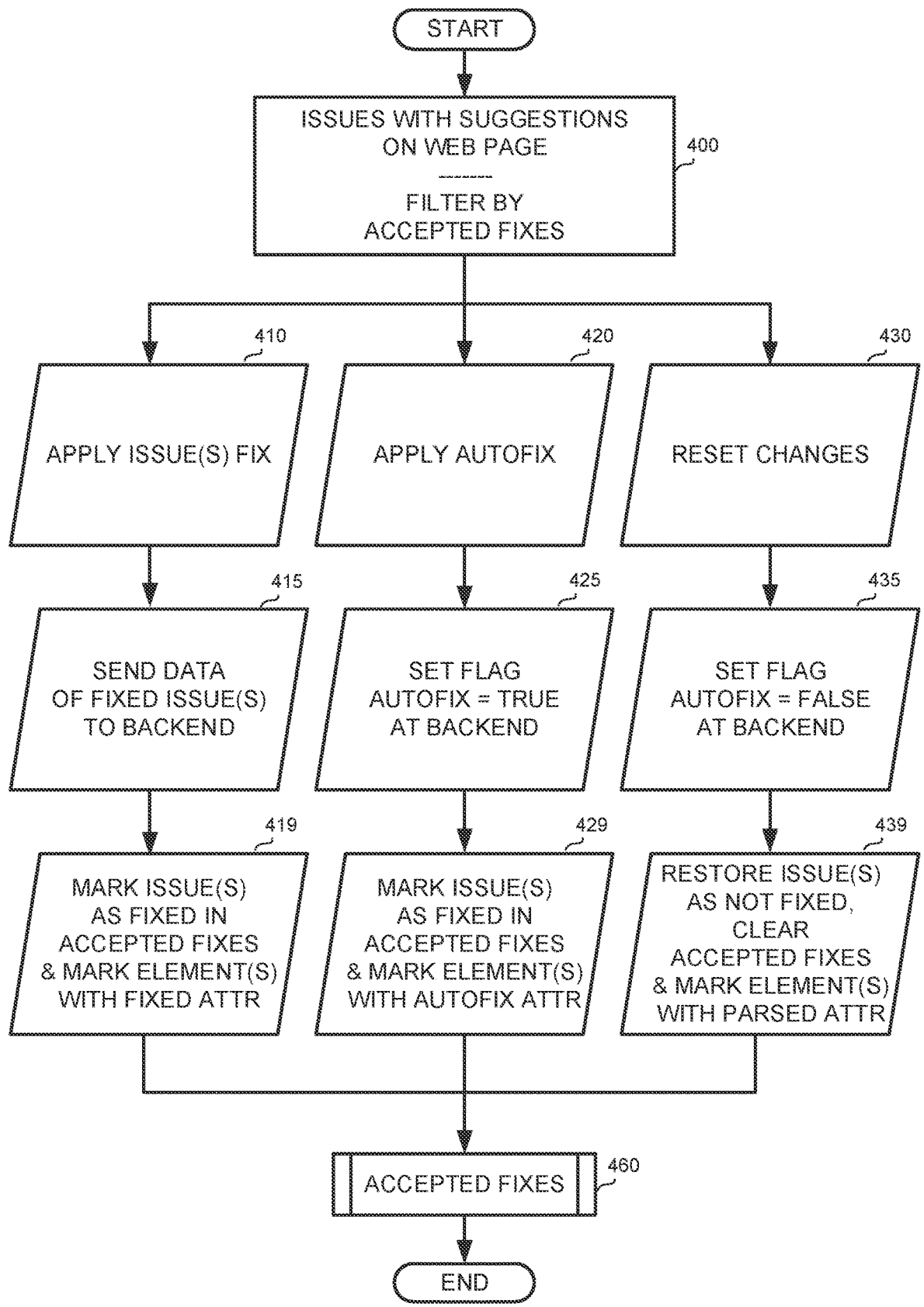
FIG. 4 is a flowchart schematically representing an optional flow of operations for control and management of color correction, according to some embodiments.

Reference is now made to FIG. 4 which is a flowchart schematically representing an optional flow of operations for control and management of color contrast ratio correction, according to some embodiments.

At 400 a list of issues with suggestions for color correction(s) of element(s) in a digital container (e.g., a web page and/or the like) for compliance with contrast ratio requirements may be obtained, and optionally filtered by a set of accepted fixes such that only issues without an accepted fix therefor may remain. The issues with suggestions listed may be obtained similarly as described herein with reference to FIGS. 1A-1E. The set of accepted fixes comprising color corrections previously approved by a user may be retrieved from a data store, such as a backend server and/or the like. The filtered list of issues with suggestions may be provided as output via a user interface. The user may review items of the issues with suggestions (optionally filtered) list as presented on the user interface and use an input feed integrated therein to accept, reject, and/or edit a proposed color correction.

At 410 a user may apply issue(s) fix by acceptance of proposed color correction(s) from the (optionally filtered) list of issues with suggestions as obtained at 400. At 415 data about fixed issue(s) as approved by the user at 410 may be sent to a backend server for update and storage thereon. At 419 respective issue(s) reported at 415 as being corrected at 410 may be marked as fixed in a set of accepted fixes and respective element(s) to which such correction(s) pertaining may be marked with a FIXED attribute and/or the like.

Additionally or alternatively at 420 the user may apply automatic fix (autofix) whereby issue(s) itemized in the (optionally filtered) list of issues with suggestions as obtained at 400 may be automatically fixed. At 425 an AUTOFIX flag may be set to TRUE at the backend server. At 429 issue(s) fixed automatically at 420 as flagged at 425 may be marked as fixed in the set of accepted fixes and respective element(s) to which the correction pertain may be marked with a AUTOFIX attribute and/or the like.

Additionally or alternatively at 430 the user may reset changes applied to element(s) of the container in correction of color(s) thereof, such as effected through performance of act(s) and/or operation(s) as in 410 and/or 420 and onwards. At 435 the AUTOFIX flag may be set to FALSE at the backend server. At 439 issue(s) in the (optionally filtered) list of issues with suggestions as obtained at 400 may be restored as not fixed, the set of accepted fixes may be cleared and respective element(s) to which such revoked correction(s) pertaining may be marked with a PARSED attribute and/or the like.

At 460 an up to date version of the set of accepted fixes may be obtained responsive to performance of act(s) and/or operation(s) as in 410, 420 and/or 430 and onwards.

Figure 5:
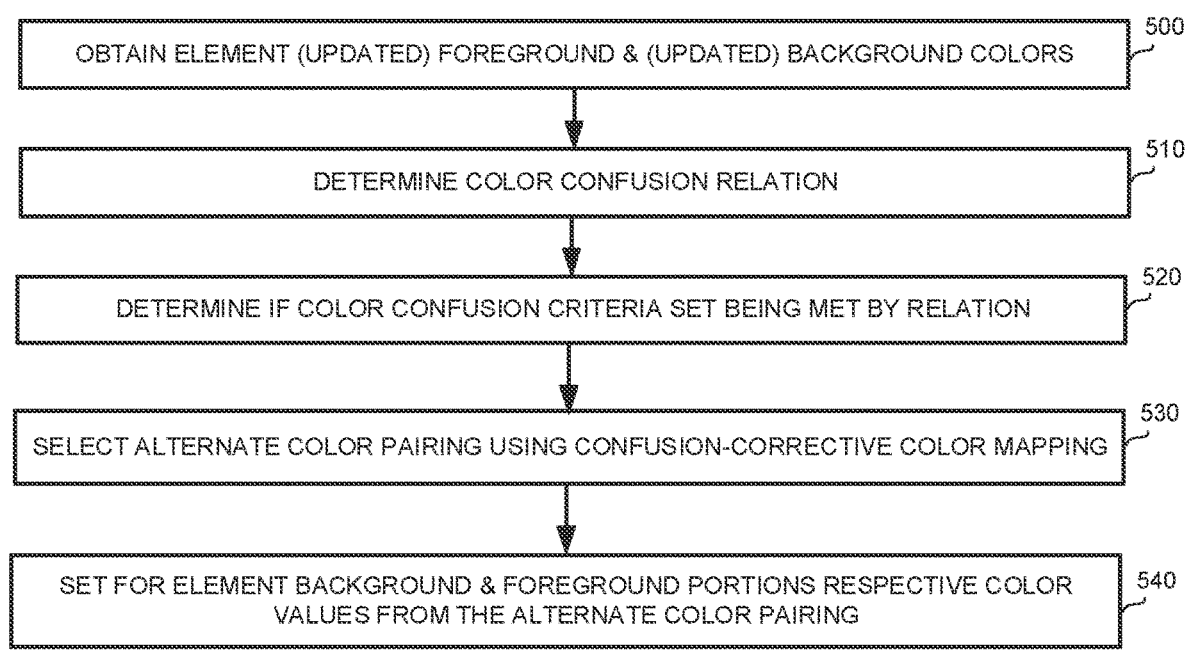
FIG. 5 is a flowchart diagram of a method for color correction in confusion mitigation, according to some embodiments.

Reference is now made to FIG. 5 which is a flowchart diagram of a method for color correction in confusion mitigation, according to some embodiments.

At 500 respective color values of a foreground and background portions of an element may be obtained. The color values may be the foreground and background colors prior to contrast correction, as obtained at 200 of FIG. 2, the background and updated foreground colors following contrast correction initiation, as obtained at 300 of FIG. 3, the updated foreground and updated background colors following contrast correction (one or more iterations), and/or the like.

At 510 a color confusion relation between the (possibly updated) foreground and (possibly updated) background colors obtained at 500 may be determined, for example by querying a respective color confusion table and/or likewise data structure.

At 520 a determination may be made whether the color confusion relation determined at 510 meets a set of color confusion criteria, such as for example, an exceeding of a predetermined threshold by a numerical value denoting a likelihood of confusion according to the relation and/or the like.

At 530 an alternate color pairing for the foreground and background portions of the element may be selected using a confusion-corrective color mapping, according to default and/or custom setting thereof for a prescribed color standard.

At 540 color value(s) of at least one of the foreground and background portions of the element may be set using respective value(s) from the alternate color pairing selected at 530.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant color contrast ratio correction techniques and tools will be developed and the scope of the term color contrast ratio correction is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a". "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as and/or other embodiments preferred or advantageous over to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for correcting color of elements rendered as visual display output of a computing device, comprising:
    in each of a plurality of iterations, processing a visual element of a digital content container comprising a plurality of visual elements for rendition, the visual element comprising at least a foreground and background portions for which a foreground and background display color values are defined respectively, said processing comprising:
    responsive to an expected contrast ratio exceeding a contrast ratio calculated as a function of the foreground and background display color values, performing:
        determining, in relation to the expected contrast ratio and based on the background display color value, an expected foreground luminance value for the foreground portion and a substitute foreground luminance value as a function thereof;
        obtaining at least one foreground chromaticity value by converting the foreground display color value into a multi-dimensional chromatic valence color space;
        obtaining an updated foreground display color value by inversely converting the substitute foreground luminance value and the at least one foreground chromaticity value; and,
    responsive to the expected contrast ratio not exceeding an updated contrast ratio calculated as a function of the background and updated foreground display color values, providing an output of the updated foreground display color value.

2. The method of claim 1, further comprising:
    responsive to the expected contrast ratio exceeding the updated contrast ratio, performing:
        determining, in relation to the expected contrast ratio and based on the updated foreground display color value, an expected background luminance value for the background portion and a substitute background luminance value as a function thereof;

obtaining at least one background chromaticity value by converting the background display color value into the multi-dimensional chromatic valence color space;

obtaining an updated background display color value by inversely converting the substitute background luminance value and the at least one background chromaticity value; and, providing an output of the updated foreground and updated background display color values.

3. The method of claim 2, further comprising:

responsive to a color confusion relationship between the updated background and updated foreground display color values meeting at least one predefined color confusion criterion, setting for at least one of the background and foreground portions of the visual element an alternate color value obtained using a confusion-corrective color mapping.

4. The method of claim 2, wherein the digital content container is associated with a content structure exposing an application programming interface enabling modification of the visual element, whereby modification of the foreground display color value defined for the foreground portion of the visual element to the updated foreground display color value, and of the background display color value defined for the background portion of the visual element to the updated background display color value, is enabled via use of the application programming interface.

5. The method of claim 1, wherein the expected contrast ratio is determined as a function of a font size associated with a textual content of the visual element.

6. The method of claim 1, wherein the display color space is a red-green-blue (RGB) color space and the multi-dimensional chromatic valence space is CIELAB (L*a*b*) color space.

7. The method of claim 1, further comprising:

responsive to obtaining the digital content container, transmitting to a server a request for receiving a set of contrast ratio corrections previously accepted by a user, and applying each contrast ratio correction of the set to a respective one of the plurality of visual elements.

8. The method of claim 1, further comprising:

responsive to a user accepting a contrast ratio correction suggestion comprising the output, transmitting to a server an indication of the contrast ratio correction suggestion accepted by the user for recordation thereof in a data storage coupled to the server for allowing retrieval thereof in response to a request made to the server.

9. The method of claim 1, wherein the digital content container is associated with a content structure exposing an application programming interface enabling modification of the visual element, whereby modification of the foreground display color value defined for the foreground portion of the visual element to the updated foreground display color value is enabled via use of the application programming interface.

10. The method of claim 1, further comprising:

responsive to a color confusion relationship between the background display color value and at least one of the foreground and updated foreground display color values meeting at least one predefined color confusion criterion, setting for at least one of the background and foreground portions of the visual element an alternate color value obtained using a confusion-corrective color mapping.

11. A computer program product comprising:

a non-transitory computer readable storage medium;

program instructions for executing, by a processor, a method for correcting color of elements rendered as visual display output of a computing device, the method comprising:

in each of a plurality of iterations, processing a visual element of a digital content container comprising a plurality of visual elements for rendition, the visual element comprising at least a foreground and background portions for which a foreground and background display color values are defined respectively, said processing comprising:

responsive to an expected contrast ratio exceeding a contrast ratio calculated as a function of the foreground and background display color values, performing:

determining, in relation to the expected contrast ratio and based on the background display color value, an expected foreground luminance value for the foreground portion and a substitute foreground luminance value as a function thereof;

obtaining at least one foreground chromaticity value by converting the foreground display color value into a multi-dimensional chromatic valence color space;

obtaining an updated foreground display color value by inversely converting the substitute foreground luminance value and the at least one foreground chromaticity value; and, responsive to the expected contrast ratio not exceeding an updated contrast ratio calculated as a function of the background and updated foreground display color values, providing an output of the updated foreground display color value.

12. The computer program product of claim 11, further comprising program instructions for executing, by the processor:

responsive to the expected contrast ratio exceeding the updated contrast ratio, performing:

determining, in relation to the expected contrast ratio and based on the updated foreground display color value, an expected background luminance value for the background portion and a substitute background luminance value as a function thereof;

obtaining at least one background chromaticity value by converting the background display color value into the multi-dimensional chromatic valence color space;

obtaining an updated background display color value by inversely converting the substitute background luminance value and the at least one background chromaticity value; and, providing an output of the updated foreground and updated background display color values.

13. The computer program product of claim 12, further comprising program instructions for executing, by the processor:

responsive to a color confusion relationship between the background display color value and at least one of the foreground and updated foreground display color values meeting at least one predefined color confusion criterion, setting for at least one of the background and foreground portions of the visual element an alternate color value obtained using a confusion-corrective color mapping.

14. The computer program product of claim 11, further comprising program instructions for executing, by the processor:

responsive to a color confusion relationship between the background display color value and at least one of the foreground and updated foreground display color values meeting at least one predefined color confusion criterion, setting for at least one of the background and foreground portions of the visual element an alternate color value obtained using a confusion-corrective color mapping.

15. The computer program product of claim 11, wherein the digital content container is associated with a content structure exposing an application programming interface enabling modification of the visual element, whereby modification of the foreground display color value defined for the foreground portion of the visual element to the updated foreground display color value is enabled via use of the application programming interface.

16. A system for correcting color of elements rendered as visual display output of a computing device, comprising:

a processing circuitry adapted to execute a code for:

in each of a plurality of iterations, processing a visual element of a digital content container comprising a plurality of visual elements for rendition, the visual element comprising at least a foreground and background portions for which a foreground and background display color values are defined respectively, said processing comprising:

responsive to an expected contrast ratio exceeding a contrast ratio calculated as a function of the foreground and background display color values, performing:

determining, in relation to the expected contrast ratio and based on the background display color value, an expected foreground luminance value for the foreground portion and a substitute foreground luminance value as a function thereof;

obtaining at least one foreground chromaticity value by converting the foreground display color value into a multi-dimensional chromatic valence color space;

obtaining an updated foreground display color value by inversely converting the substitute foreground luminance value and the at least one foreground chromaticity value; and, responsive to the expected contrast ratio not exceeding an updated contrast ratio calculated as a function of the background and updated foreground display color values, providing an output of the updated foreground display color value.

17. The system of claim 16, wherein the processing circuitry being further adapted to execute a code for:

responsive to the expected contrast ratio exceeding the updated contrast ratio, performing:

determining, in relation to the expected contrast ratio and based on the updated foreground display color value, an expected background luminance value for the background portion and a substitute background luminance value as a function thereof;

obtaining at least one background chromaticity value by converting the background display color value into the multi-dimensional chromatic valence color space;

obtaining an updated background display color value by inversely converting the substitute background luminance value and the at least one background chromaticity value; and, providing an output of the updated foreground and updated background display color values.

18. The system of claim 17, the processing circuitry being further adapted to execute a code for:

responsive to a color confusion relationship between the background display color value and at least one of the foreground and updated foreground display color values meeting at least one predefined color confusion criterion, setting for at least one of the background and foreground portions of the visual element an alternate color value obtained using a confusion-corrective color mapping.

19. The system of claim 16, the processing circuitry being further adapted to execute a code for:

responsive to a color confusion relationship between the background display color value and at least one of the foreground and updated foreground display color values meeting at least one predefined color confusion criterion, setting for at least one of the background and foreground portions of the visual element an alternate color value obtained using a confusion-corrective color mapping.

20. The system of claim 16, wherein the digital content container is associated with a content structure exposing an application programming interface enabling modification of the visual element, whereby modification of the foreground display color value defined for the foreground portion of the visual element to the updated foreground display color value is enabled via use of the application programming interface.

* * * * *